(12) United States Patent
Mizawa et al.

(10) Patent No.: US 11,450,893 B2
(45) Date of Patent: *Sep. 20, 2022

(54) NONAQUEOUS ELECTROLYTE SECONDARY BATTERY

(71) Applicant: SANYO Electric Co., Ltd., Daito (JP)

(72) Inventors: Atsushi Mizawa, Hyogo (JP); Kei Kobayashi, Osaka (JP); Takaki Nakao, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/973,131

(22) PCT Filed: Jun. 17, 2019

(86) PCT No.: PCT/JP2019/023826
§ 371 (c)(1),
(2) Date: Dec. 8, 2020

(87) PCT Pub. No.: WO2019/244818
PCT Pub. Date: Dec. 26, 2019

(65) Prior Publication Data
US 2021/0257672 A1 Aug. 19, 2021

(30) Foreign Application Priority Data

Jun. 20, 2018 (JP) .............................. JP2018-117009

(51) Int. Cl.
*H01M 50/107* (2021.01)
*H01M 50/10* (2021.01)
(Continued)

(52) U.S. Cl.
CPC .... *H01M 10/0587* (2013.01); *H01M 10/0422* (2013.01); *H01M 10/0468* (2013.01); *H01M 50/107* (2021.01)

(58) Field of Classification Search
CPC .... H01M 50/20; H01M 50/10; H01M 50/107; H01M 10/0587; H01M 10/04
See application file for complete search history.

(56) References Cited

U.S. PATENT DOCUMENTS

2006/0257726 A1* 11/2006 Kelley ................ H01M 50/463
429/185
2008/0102354 A1* 5/2008 Lee .................... H01M 10/0431
429/94
(Continued)

FOREIGN PATENT DOCUMENTS

JP 9-161814 A 6/1997
JP 2009-117290 A 5/2009
(Continued)

OTHER PUBLICATIONS

The Extended European Search Report dated Jun. 24, 2021, issued in counterpart EP Application No. 19823293.6. (7 pages).
(Continued)

*Primary Examiner* — Kenneth J Douyette
(74) *Attorney, Agent, or Firm* — WHDA, LLP

(57) ABSTRACT

A battery including an electrode group with a positive electrode plate and a negative electrode plate, and tape. A current collector of the negative electrode plate is exposed in at least part of the outermost peripheral surface of the electrode group in the winding direction, and the current collector contacts a case body. The tape comprises a base material layer and an adhesive layer arranged continuously in the winding direction on the inner surface of the wound base material layer. Dividing the region of the tape, seen from the wound inner surface, into first regions configured from the base material layer and second regions configured from the base material layer and the adhesive layer, in the winding axial direction of the electrode group, the first (Continued)

regions are arranged adjacent to a second region in at least the center end of the electrode group on the both ends of the tape.

3 Claims, 6 Drawing Sheets

(51) Int. Cl.
*H01M 10/0587* (2010.01)
*H01M 10/04* (2006.01)

(56) References Cited

U.S. PATENT DOCUMENTS

| | | |
|---|---|---|
| 2010/0233524 A1 | 9/2010 | Hina et al. |
| 2012/0107573 A1 | 5/2012 | Iwata et al. |
| 2012/0115025 A1 | 5/2012 | Kim et al. |
| 2014/0106207 A1 | 4/2014 | Kim et al. |

FOREIGN PATENT DOCUMENTS

| | | |
|---|---|---|
| JP | 2009-199974 A | 9/2009 |
| JP | 2010-92673 A | 4/2010 |
| JP | 2011-77279 A | 4/2011 |
| JP | 2015-8140 A | 1/2015 |
| JP | 2016-47929 A | 4/2016 |
| WO | 2009/144919 A1 | 12/2009 |

OTHER PUBLICATIONS

International Search Report dated Aug. 13, 2019, issued in counterpart Application No. PCT/JP2019/023826. with English translation (5 pages).

* cited by examiner

NONAQUEOUS ELECTROLYTE SECONDARY BATTERY

TECHNICAL FIELD

The present disclosure relates to a non-aqueous electrolyte secondary battery.

BACKGROUND ART

There has been conventionally known a non-aqueous electrolyte secondary battery that comprises an electrode group in which a positive electrode plate and a negative electrode plate are wound with a separator interposed therebetween, and a battery case in which the electrode group and an electrolytic solution are housed. In this secondary battery, the electrode group is fixed by attaching a tape to an outermost peripheral surface of the electrode group (see PATENT LITERATURES 1 and 2). In addition, there has been conventionally known that in the non-aqueous electrolyte secondary battery, a current collector of the negative electrode plate is exposed on the outermost peripheral surface of the electrode group so as to bring the current collector into contact with the battery case, whereby the heat dissipation capability of the battery is improved, and the heat generation of the battery in the event of an external short circuit is suppressed (see PATENT LITERATURE 3).

CITATION LIST

Patent Literature

PATENT LITERATURE 1: Japanese Unexamined Patent Application Publication No. H9-161814
PATENT LITERATURE 2: Japanese Unexamined Patent Application Publication No. 2009-199974
PATENT LITERATURE 3: International Publication No. WO 2009/144919

SUMMARY

The electrode group expands during a charge-and-discharge cycle of the non-aqueous electrolyte secondary battery, and a pressure from the battery case acts on the electrode group. At this time, there may occur an electrode plate deformation such that the electrode plates forming the electrode group are bent. When a large electrode plate deformation occurs, it may lead to an internal short circuit. Thus, it is an important issue for the non-aqueous electrolyte secondary battery to sufficiently suppress such an electrode plate deformation that may contribute to the internal short circuit.

It is an advantage of the present disclosure to provide a non-aqueous electrolyte secondary battery that can ensure manufacturing workability and suppress an electrode plate deformation that may contribute to internal short circuit, in a configuration in which a current collector of a negative electrode plate in an outermost peripheral surface of an electrode group contacts a case body and a tape is attached to the outermost peripheral surface of the electrode group.

A non-aqueous electrolyte secondary battery according to the present disclosure comprises a bottomed cylindrical case body having an opening, a wound-type electrode group that is housed in the case body, and in which a positive electrode plate and a negative electrode plate are wound with a separator interposed therebetween, and at least one tape that is attached to an outermost peripheral surface of the electrode group to fix a winding-finish end of the electrode group to the outermost peripheral surface of the electrode group. The tape is attached to at least one of both end portions of the electrode group in a winding axis direction. A current collector of the negative electrode plate is exposed on at least a part of the outermost peripheral surface of the electrode group in a winding direction, and the current collector contacts the case body. The tape includes a base material layer, and an adhesive layer that is disposed continuously in the winding direction on a winding inner surface of the base material layer. When a region of the tape as viewed from the winding inner surface is divided into a first region formed by the base material layer and a second region formed by the base material layer and the adhesive layer, in the winding axis direction of the electrode group, the first region is disposed at least in an end portion on a center side of the electrode group of both end portions of the tape, to be adjacent to the second region.

According to the non-aqueous electrolyte secondary battery according to the present disclosure, in a configuration in which the current collector of the negative electrode plate in the outermost peripheral surface of the electrode group contacts the case body and the tape is attached to the outermost peripheral surface of the electrode group, the pressure received by the electrode group from the battery case via the tape can be prevented from being increased excessively when the electrode group expands during charging and discharging. This enables suppression of an electrode plate deformation that may contribute to internal short circuit in the electrode group. In addition, since the tape includes the first region having a small thickness at least in the end portion on the center side of the electrode group in the winding axis direction, the width of the tape can be set appropriately while suppressing increase in pressure received by the electrode group from the battery case via the tape. This can ensure the manufacturing workability of the battery.

DESCRIPTION OF EMBODIMENTS

Hereinafter, an embodiment of the present invention will be described in detail with reference to the accompanying drawings. In the following description, specific shapes, materials, numerical values, directions, or the like are exemplary merely for facilitating understanding of the present invention, and may be suitably changed according to the specification of a non-aqueous electrolyte secondary battery. In the following description, a term "approximate" is used to mean, for example, cases where the values are completely equal, and also cases where the values can be considered to be substantially the same. Furthermore, in the following, when a plurality of embodiments and variations are included, it is intended from the beginning that characteristic portions thereof may be appropriately combined.

Figure 1:
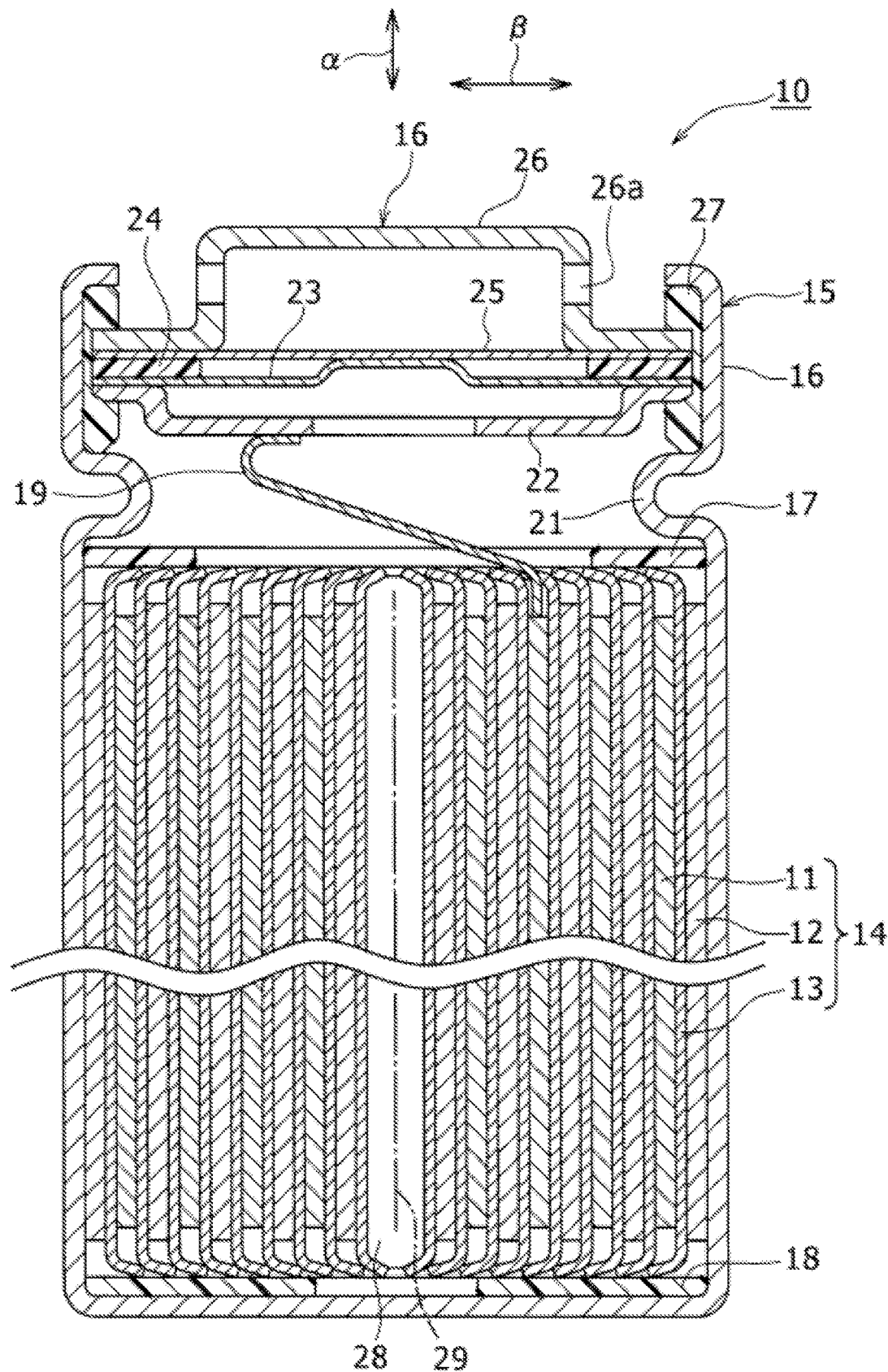
FIG. 1 is a sectional view of a non-aqueous electrolyte secondary battery of one example of an embodiment.
Figure 2:
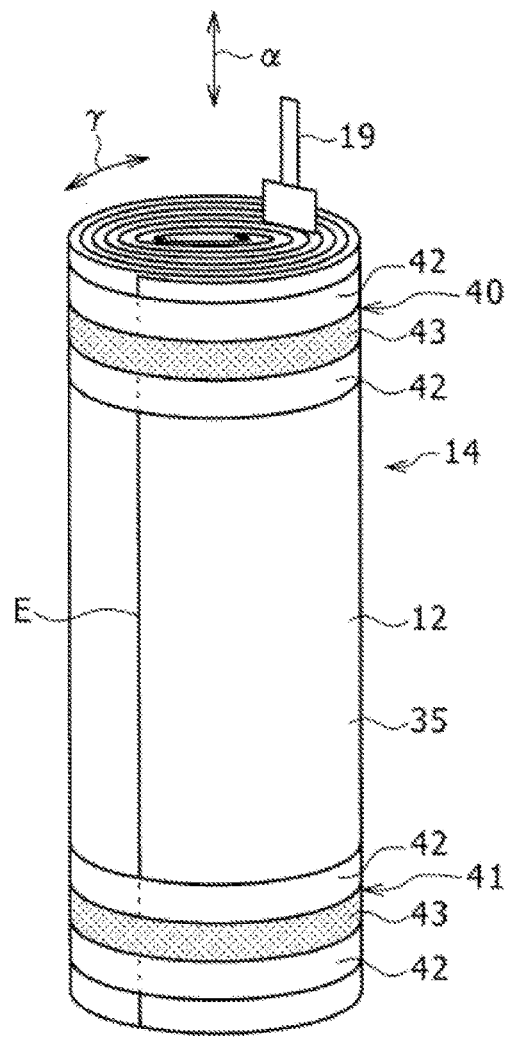
FIG. 2 is a perspective view of an electrode group constituting the non-aqueous electrolyte secondary battery of one example of the embodiment.
Figure 3:
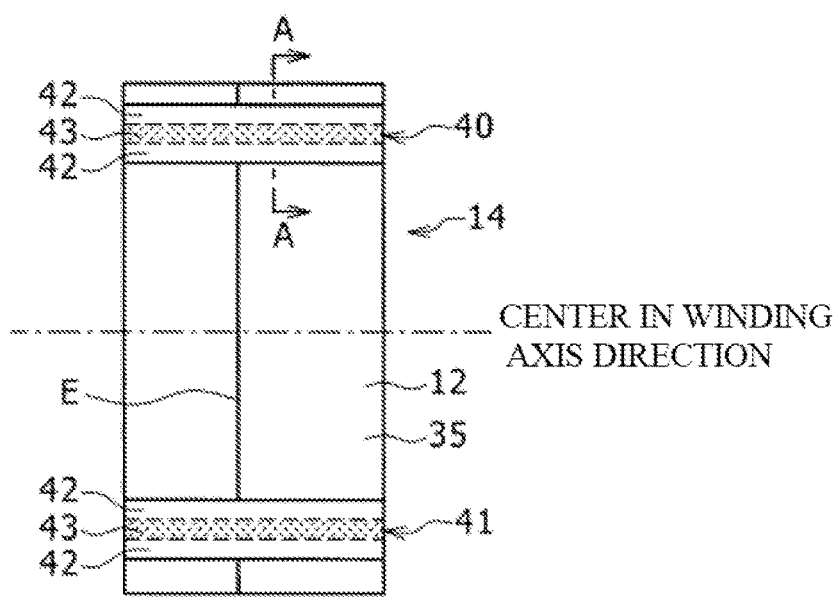
FIG. 3 is a diagram illustrating the electrode group, as viewed from a winding outer side, in one example of the embodiment.
Figure 4:
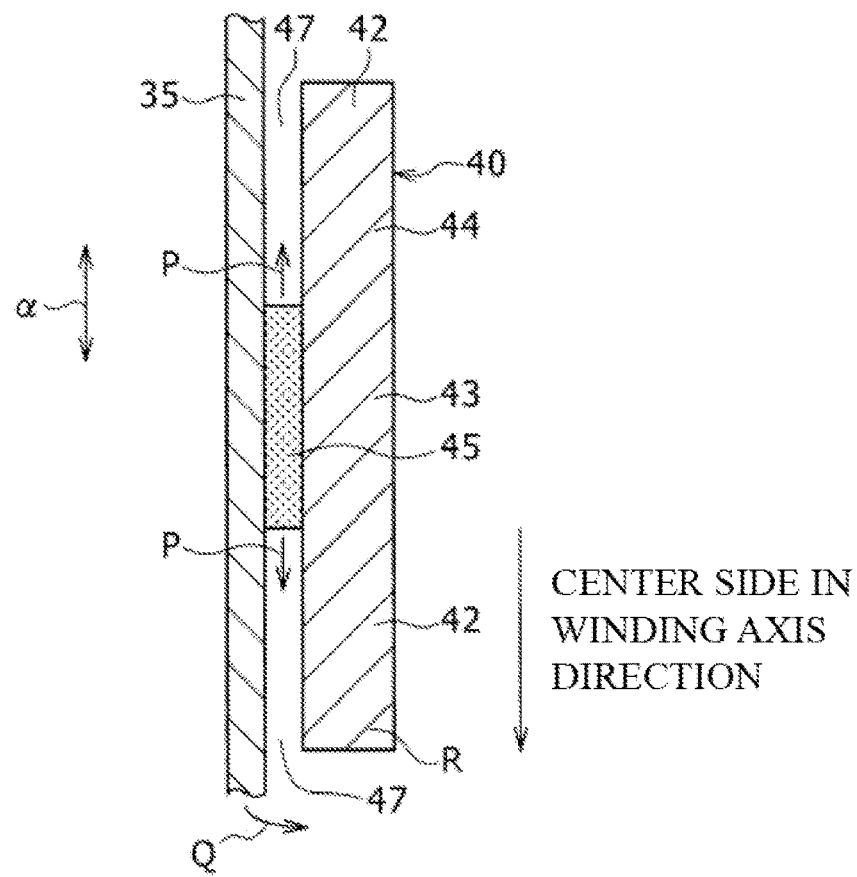
FIG. 4 is a sectional view taken along line A-A of FIG. 3 in a negative electrode current collector and a tape at an outermost periphery of the electrode group.
Figure 5:
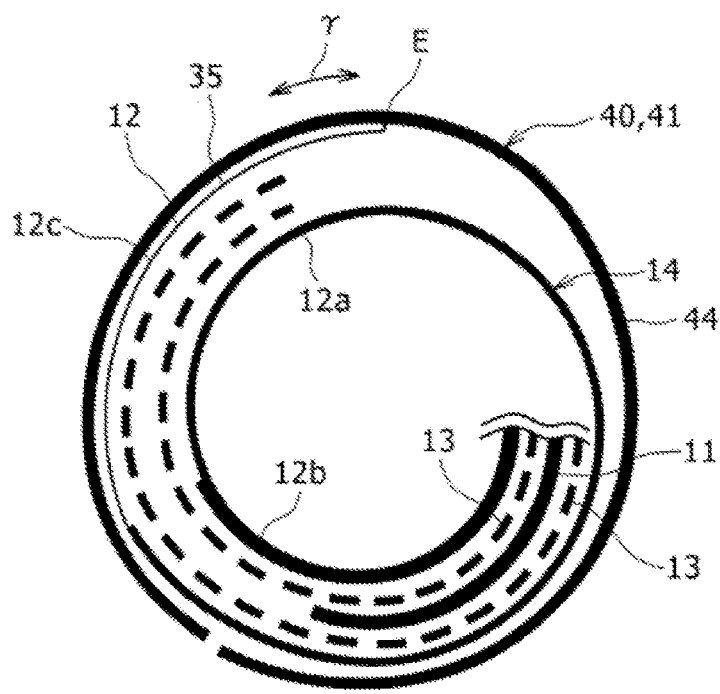
FIG. 5 is a sectional view perpendicular to a winding axis direction of a portion on a winding outer side of the electrode group, in one example of the embodiment.

FIG. 1 is a sectional view of a non-aqueous electrolyte secondary battery 10 of an embodiment. FIG. 2 is a perspective view of an electrode group 14 constituting the non-aqueous electrolyte secondary battery 10. FIG. 3 is a diagram illustrating the electrode group 14, as viewed from a winding outer side (an outer peripheral surface side). FIG. 4 is a sectional view taken along line A-A of FIG. 3 in a negative electrode current collector and a tape at an outermost periphery of the electrode group 14. FIG. 5 is a sectional view perpendicular to a winding axis direction of a portion on a winding outer side (a portion on an outer peripheral surface side) of the electrode group 14. As illustrated in FIGS. 1 to 5, the non-aqueous electrolyte secondary battery 10 comprises the wound-type electrode group 14, a first tape 40 and a second tape 41 (see FIGS. 2 to 5) that are attached to the outermost peripheral surface of the electrode group 14, a non-aqueous electrolyte (not illustrated), a case body 15, and a sealing assembly 16. The wound-type electrode group 14 includes a positive electrode plate 11, a negative electrode plate 12, and a separator 13, and the positive electrode plate 11 and the negative electrode plate 12 are spirally wound with the separator 13 interposed therebetween. Hereinafter, one side of the electrode group 14 in the winding axis direction is referred to as an "upper side," and the other side of the electrode group 14 in the winding axis direction is referred to as a "lower side," in some cases. The non-aqueous electrolyte includes a non-aqueous solvent and an electrolyte salt dissolved in the non-aqueous solvent. The non-aqueous electrolyte is not limited to a liquid electrolyte and may also be a solid electrolyte using a gel polymer or the like.

The positive electrode plate 11 includes a belt-shaped positive electrode current collector, and a positive electrode lead 19 (see FIGS. 1 and 2) bonded to the positive electrode current collector. The positive electrode lead 19 is a conductive member for electrically connecting the positive electrode current collector and a positive electrode terminal, and extends from an upper end of the positive electrode current collector of the electrode group 14 toward the one side (upward) of the electrode group 14 in the winding axis direction α. The positive electrode lead 19 is provided at an approximately center portion of the electrode group 14 in a radial direction β thereof, for example. The positive electrode lead 19 is a belt-shaped conductive member. A constituent material of the positive electrode lead is not limited to a particular material. The positive electrode lead 19 is preferably formed from a metal containing aluminum as a primary component. Furthermore, the positive electrode plate 11 has a positive electrode active material layer formed on each of a winding inner surface (an inner surface in the radial direction) and a winding outer surface (an outer surface in the radial direction) of the positive electrode current collector.

The negative electrode plate 12 includes a belt-shaped negative electrode current collector 35 (see FIGS. 4 and 5) and a negative electrode active material layer formed on each of a winding inner surface (an inner surface in the radial direction) and a winding outer surface (an outer surface in the radial direction) of the negative electrode current collector 35. In the negative electrode plate 12, the negative electrode current collector 35 in the outermost peripheral surface of the electrode group 14 contacts the inner surface of a cylindrical portion of the case body 15 (described later) used as a negative electrode terminal, so that the negative electrode current collector 35 is electrically connected to the case body 15. Therefore, the negative electrode current collector 35 is exposed on the entire outermost peripheral surface of the electrode group 14 in a circumference direction, so that the negative electrode current collector 35 contacts the case body 15.

Note that the negative electrode lead (not illustrated) can be connected to the negative electrode current collector in a state in which the negative electrode current collector that is exposed on the outermost peripheral surface of the electrode group 14 is brought into contact with the inner surface of the cylindrical portion of the case body 15. In this case, a portion in the negative electrode lead that extends further downward than the negative electrode current collector is electrically connected to a bottom plate of the case body 15. The negative electrode lead is a belt-shaped conductive member. A constituent material of the negative electrode lead is not limited to a particular material. The negative electrode lead is preferably formed from a metal containing nickel or copper as a primary component, or a metal containing both of nickel and copper. According to the above-described configuration in which the negative electrode current collector 35 is brought into contact with the cylindrical portion of the case body 15, good current collectability can be obtained more easily than a configuration in which the negative electrode lead is electrically connected to the bottom plate of the case body 15 without bringing the negative electrode current collector into contact with the cylindrical portion of the case body.

As described above, the electrode group 14 has a winding structure in which the positive electrode plate 11 and the negative electrode plate 12 are spirally wound with the separator 13 interposed therebetween. The positive electrode plate 11, the negative electrode plate 12, and the separator 13 are each formed to have a belt shape, and are spirally wound around a winding core portion so as to be alternately laminated to one another in the radial direction β of the electrode group 14. A space 28 is formed in the winding core portion, and a center axis along a longitudinal direction of the space 28 is a winding axis 29. In the electrode group 14, the longitudinal direction of each electrode plate is a winding direction γ (see FIGS. 2 and 5), and the width direction of each electrode plate is the winding axis direction α (see FIGS. 1 and 2).

As illustrated in FIGS. 2, 3, and 5, each of the first tape 40 and the second tape 41 is a fastening tape that is attached to the outermost peripheral surface of the electrode group 14 to fix a winding-finish end E of the electrode group 14 to the outermost peripheral surface of the electrode group 14. The first tape 40 is attached to a first end portion on the end side (an upper side end portion illustrated in FIGS. 2 and 3) of the electrode group 14 in the winding axis direction α. The second tape 41 is attached to a second end portion on the end side (a lower side end portion illustrated in FIGS. 2 and 3) of the electrode group 14 in the winding axis direction α. Each of the tapes 40 and 41 is attached to the outermost peripheral surface of the electrode group 14 to extend across the winding-finish end E (see FIG. 3) of the electrode group 14 in the winding direction. In the present embodiment, the winding-finish end of the negative electrode current collector 35 corresponds to the winding-finish end E of the electrode group 14. However, the winding-finish end of the separator 13 drawn in the winding direction γ from the inside of the winding of the winding-finish end of the negative electrode plate 12 may be also the winding-finish end E of the electrode group 14, not to interfere with contact between the negative electrode current collector 35 in the outermost peripheral surface of the electrode group 14 and the case body 15.

In each of the tapes 40 and 41, first regions 42 are disposed at both end portions of the tape in the winding axis direction α, respectively, to be adjacent to a second region 43. In FIGS. 2 and 3, in the tapes 40 and 41, the first region 42 is represented by a plain portion, and the second region 43 is represented by a sand-like pattern portion. This enables suppression of an electrode plate deformation that may contribute to internal short circuit in the electrode group 14 and improvement in manufacturing workability. The first tape 40 and the second tape 41 will be described in detail later.

In an example illustrated in FIG. 1, a metal-made battery case housing the electrode group 14 and the non-aqueous electrolyte is formed by the case body 15 and the sealing assembly 16. Insulating plates 17 and 18 are provided at an upper side and a lower side of the electrode group 14, respectively. The positive electrode lead 19 extends to a sealing assembly 16 side through a through-hole of the upper insulating plate 17, and is welded to a bottom surface of a filter 22 which is a bottom plate of the sealing assembly 16. In the non-aqueous electrolyte secondary battery 10, a cap 26 which is a top plate of the sealing assembly 16 electrically connected to the filter 22 is used as the positive electrode terminal.

The case body 15 is formed into a bottomed cylindrical shape having an opening, and for example, is a metal-made container having a bottomed cylindrical shape. A gasket 27 is provided between the case body 15 and the sealing assembly 16 so that air tightness in the battery case is secured. The case body 15 has a projecting portion 21 that is formed, for example, by pressing a side surface portion from the outside and that supports the sealing assembly 16. The projecting portion 21 is preferably formed into an annular shape along the circumference direction of the case body 15, and an upper surface of the projecting portion 21 supports the sealing assembly 16. The sealing assembly 16 seals the opening of the case body 15.

The sealing assembly 16 includes the filter 22, a lower vent member 23, an insulating member 24, an upper vent member 25, and a cap 26 that are laminated in this order from an electrode group 14 side. The individual members forming the sealing assembly 16 each have, for example, a circular plate shape or a ring shape, and the members other than the insulating member 24 are electrically connected to one another. The lower vent member 23 and the upper vent member 25 are connected to each other at the center portions thereof, and the insulating member 24 is provided between the peripheral edge portions of the vent members. When an internal pressure of the battery is increased due to abnormal heat generation, for example, the lower vent member 23 is fractured, and the upper vent member 25 is expanded to a cap 26 side and is separated from the lower vent member 23, so that the electrical connection between the vent members is disconnected. When the internal pressure is further increased, the upper vent member 25 is fractured, and gas is exhausted from an opening 26a of the cap 26.

Hereinafter, with reference to FIGS. 2 to 5, the electrode group 14, the first tape 40 and the second tape 41 will be described in detail. In the electrode group 14, a length of the negative electrode plate 12 in the longitudinal direction corresponding to the winding direction γ is larger than a length of the positive electrode plate 11 (see FIG. 5) in the longitudinal direction. In this way, in the electrode group 14, a portion in which the positive electrode active material layer of the positive electrode plate 11 is formed is at least disposed to face a portion in which the negative electrode active material layer of the negative electrode plate 12 is formed via the separator 13. As illustrated in FIG. 5, the negative electrode plate 12 includes an one-side active material region 12a indicated by an intermediate-thickness line, a both-side active material region 12b indicated by a line thicker than the intermediate-thickness line, and a plain region 12c indicated by a line thinner than the intermediate-thickness line. In the both-side active material region 12b, the negative electrode active material layers are formed on both of surfaces on the winding outer side and the winding inner side of the negative electrode current collector 35, respectively. In the one-side active material region 12a, the negative electrode active material layer is formed on only the winding inner surface which is on the winding core side of the negative electrode current collector 35. In the plain region 12c, no negative electrode active material layer is formed on each of the surfaces on the winding outer side and the winding inner side of the negative electrode current collector 35. FIG. 5 illustrates two separators 13 by dashed lines.

The positive electrode plate 11 includes the positive electrode current collector and the positive electrode active material layer formed on the positive electrode current collector. In the present embodiment, the positive electrode active material layers are formed on both sides of the positive electrode current collector. For the positive electrode current collector, there is used, for example, foil of a metal such as aluminum, a film having a surface layer on which the above-described metal is disposed, or the like. A preferable positive electrode current collector is foil of a metal containing aluminum or an aluminum alloy as a primary component. The thickness of the positive electrode current collector is, for example, 10 to 30 μm.

The positive electrode active material layer preferably contains a positive electrode active material, a conductive agent, and a binding agent. The positive electrode plate 11 is formed in such a way that after a positive electrode mixture slurry containing the positive electrode active material, the conductive agent, the binding agent, and a solvent such as N-methyl-2-pyrrolidone (NMP) is applied on both sides of the positive electrode current collector, the thus coated films are dried and then compressed.

Examples of the positive electrode active material include a lithium-containing transition metal oxide containing a transition metal element such as Co, Mn, or Ni. Although the lithium-containing transition metal oxide is not limited to a particular oxide, it is preferably a complex oxide represented by the general formula $Li_{1+x}MO_2$ (in the formula, $-0.2<x\leq 0.2$ holds, and M represents at least one of Ni, Co, Mn, and Al).

Examples of the above-described conductive agent include a carbon material such as carbon black (CB), acetylene black (AB), Ketjen black, or graphite. Examples of the above-described binding agent include a fluorine-based resin such as a polytetrafluoroethylene (PTFE), or a polyvinylidene fluoride (PVdF), a polyacrylonitrile (PAN), a polyimide (PI), an acrylic-based resin, and a polyolefin-based resin. In addition, those resins each may be used together with a carboxymethyl cellulose (CMC) or a salt thereof, a polyethylene oxide (PEO), or the like. Those resins may be used alone, or at least two types thereof may be used in combination.

The positive electrode plate 11 has a plain portion (not illustrated) at which a surface of a metal forming the positive electrode current collector is exposed. The plain portion is a portion to which the positive electrode lead 19 is connected, and is a portion at which the surface of the positive electrode current collector is not covered with the positive electrode active material layer. The positive electrode lead 19 is joined to the plain portion by ultrasonic-welding, for example.

The negative electrode plate 12 includes the negative electrode current collector 35, and the negative electrode active material layer formed on the negative electrode current collector 35. In the present embodiment, the negative electrode active material layers are formed on both sides of the negative electrode current collector 35. Furthermore, as illustrated in FIG. 5, the one-side active material region 12a in which the negative electrode active material layer is formed on only the winding inner surface of the negative electrode current collector 35 follows the winding-finish side of the both-side active material region 12b in which the negative electrode active material layers are formed on both sides of the negative electrode current collector 35. A portion combining the plain region 12c and the one-side active material region 12a of the negative electrode plate 12 has a length of one or more turns. In this way, the portion at which the winding outer surface of the negative electrode current collector 35 is not covered with the negative electrode active material layer has a length of one or more turns to reach the winding-finish end portion of the negative electrode plate 12. For the negative electrode current collector 35, there is used, for example, foil of a metal such as copper, or a film having a surface layer on which the above-described metal is disposed, or the like. The thickness of the negative electrode current collector 35 is, for example, 5 to 30 μm.

The negative electrode active material layer preferably contains a negative electrode active material and a binding agent. The negative electrode plate 12 is formed in such a way that after a negative electrode mixture slurry containing the negative electrode active material, the binding agent, water and the like is applied on both sides of the negative electrode current collector 35, the thus coated films are dried and then compressed, for example.

As the negative electrode active material, there can be used any material capable of reversibly occluding and releasing lithium ions, and for example, a carbon material such as natural graphite or artificial graphite, a metal such as Si or Sn, forming an alloy with lithium, an alloy of the above-described metal, or a complex oxide. For the binding agent contained in the negative electrode active material layer, there is used, for example, a resin similar to that used in the case of the positive electrode plate 11. When the negative electrode mixture slurry is prepared using an aqueous solvent, there may be used a styrene-butadiene rubber (SBR), a CMC or a salt thereof, a polyacrylic acid or a salt thereof, a polyvinyl alcohol, or the like. Those materials may be used alone, or at least two types thereof may be used in combination.

For the separator 13 (see FIGS. 1 and 5), there is used a porous sheet having ion permeability and an insulating property. Specific examples of the porous sheet include a microporous membrane, a woven fabric, or a non-woven fabric. The material of the separator 13 is preferably an olefin resin such as a polyethylene or a polypropylene. The thickness of the separator 13 is, for example, 10 to 50 The thickness of the separator 13 tends to be decreased in association with an increase in capacity and an increase in output of the battery. The separator 13 has, for example, a melting point of approximately 130 to 180° C.

As illustrated in FIGS. 2 to 3, and 5, the first tape 40 and the second tape 41 are attached to both end portions of the outermost peripheral surface of the electrode group 14 in the winding axis direction α to fix the winding-finish end E of the electrode group 14 which is the winding-finish end of the negative electrode plate 12, to the outermost peripheral surface of the electrode group 14 at which the negative electrode current collector 35 is exposed. As illustrated in FIG. 4 in the case of the first tape 40, each of the tapes 40 and 41 includes a base material layer 44, and an adhesive layer 45 that is disposed at a center portion in the winding axis direction α on the winding inner surface (a surface on the left side of FIG. 4) of the base material layer 44. The adhesive layer 45 is disposed continuously over the entire length in the winding direction γ of the tapes 40 and 41. In FIG. 4, the adhesive layers 45 are represented by sand-like pattern portions. Each of the tapes 40 and 41 is made of an insulating material such as a PP tape, for example. The PP tape is a tape in which the adhesive layers are formed on either side (an inner surface) of a base material layer made of porous or nonporous polypropylene (PP). The base material layer 44 of each of the tapes 40 and 41 can be made of a material suitably selected from the viewpoint of strength, resistance to electrolytic solution, processability, cost, and the like, and the material is not limited to polypropylene. As the material, there may be used a polyimide (PI), a polyethylene terephthalate (PET), a polyphenylene sulfide (PPS), or the like. The base material layer 44 may have a laminated structure, and, for example, a heat resistant layer in which inorganic particles such as a metal oxide are dispersed in an organic material can be used for a part of the base material layer. The adhesive layer 45 of each of the tapes 40 and 41 is formed of a resin having an adhesion property at room temperature, and is formed, for example, using an acrylic-based resin or a rubber-based resin.

As illustrated in FIGS. 2 to 4, in each of the tapes 40 and 41, a region as viewed from the winding inner surface can be divided into the two first regions 42 each formed by the base material layer 44 and the second region 43 formed by the base material layer 44 and the adhesive layer 45. In each of the tapes 40 and 41, the two first regions 42 and the second region 43 provided therebetween are disposed continuously over the entire length in the winding direction γ. Although the first regions 42 are disposed at both end portions of each of the tapes 40 and 41 in the winding axis direction α, respectively, to sandwich the second region 43 therebetween, the first region 42 may be disposed only in the end portion on the center side of the electrode group 14 of the above-described both end portions in the winding axis direction α. In this case, the second region 43 is disposed in the end portion on the end side of the electrode group 14 of the above-described both end portions. In FIG. 4, only the first tape 40 of the two tapes 40 and 41 is illustrated, but the same applies to the second tape 41.

Each of the tapes 40 and 41 is attached to the winding-finish end portion of the electrode group 14 and a portion of the outermost peripheral surface that is positioned in a winding-back direction, so that the intermediate portion of the tape in the winding direction γ extends across the winding-finish end E of the electrode group 14.

Note that the tape may be attached to only one position in the intermediate portion of the outermost peripheral surface of the electrode group 14 in the winding axis direction α. Alternatively, the tape may be attached to three or more positions apart from one another in the winding axis direction α on the outermost peripheral surface of the electrode group 14.

According to the above-described non-aqueous electrolyte secondary battery 10, in each of the tapes 40 and 41, the first regions 42 are disposed adjacently to the second region 43 in the winding axis direction α. In this way, when the electrode group 14 expands during charging and discharging, the adhesive layer 45 in the second region 43 is deformed to be pushed out toward spaces 47 each between the negative electrode current collector 35 and either of the base material layers 44 of the first regions 42 at both sides, as indicated by arrows P in FIG. 4, which can decrease the pressure received by the electrode group 14 from the battery case via the tapes 40 and 41. In addition, the first regions 42 each having a thickness smaller than that of the second region 43 are disposed in both end portions of each of the tapes 40 and 41 in the winding axis direction α, which can effectively reduce a localized pressure received by the electrode group 14 from the battery case via both end portions of each of the tapes 40 and 41.

In the electrode group 14, the center portion in the winding axis direction α expands more easily than both end portions in the same direction. Therefore, as in the present embodiment, the tapes 40 and 41 are preferably attached to both end portions of the electrode group 14 in the winding axis direction α, respectively. This makes it easier to ensure an electrical connection between the case body 15 and the negative electrode current collector 35 exposed on the outermost peripheral surface of the electrode group 14. In this case, as indicated by an arrow Q in FIG. 4, the outermost peripheral surface of the electrode group 14 tends to be strongly pressed against the end portion (a portion indicated by R in FIG. 4) on the center side of the electrode group 14 of both end portions of each of the tapes 40 and 41 in the winding axis direction α. At this time, the first region 42 of the tape formed by the base material layer 44 and having a small thickness is disposed in the end portion of each of the tapes 40 and 41 on the center side of the electrode group 14, which reduces the pressure acting on a portion in the electrode group 14 between the first regions 42 facing each other. This can prevent the stress from concentrating on a part of the electrode group 14 even when the electrode group 14 expands, thereby enabling suppression of an electrode plate deformation that may contribute to internal short circuit in the electrode group 14.

Figure 6:
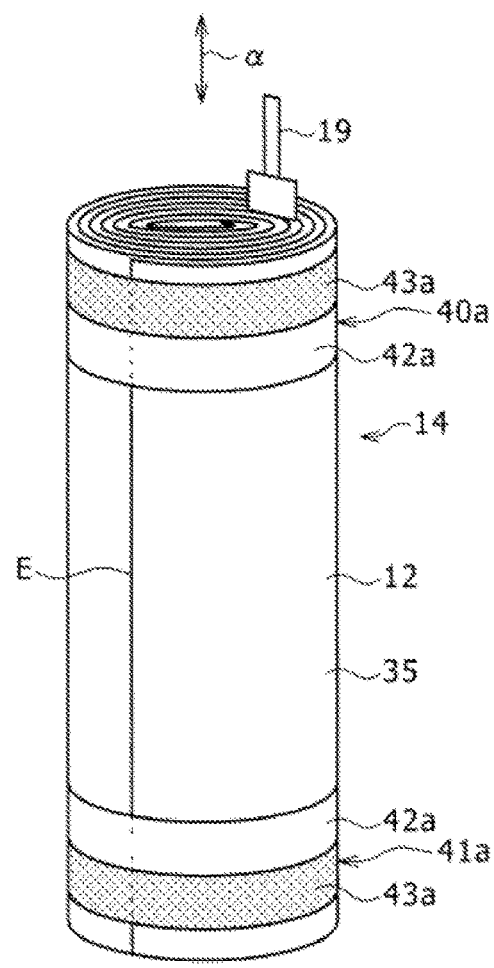
FIG. 6 is a perspective view of an electrode group in a non-aqueous electrolyte secondary battery of another example of the embodiment.
Figure 7:
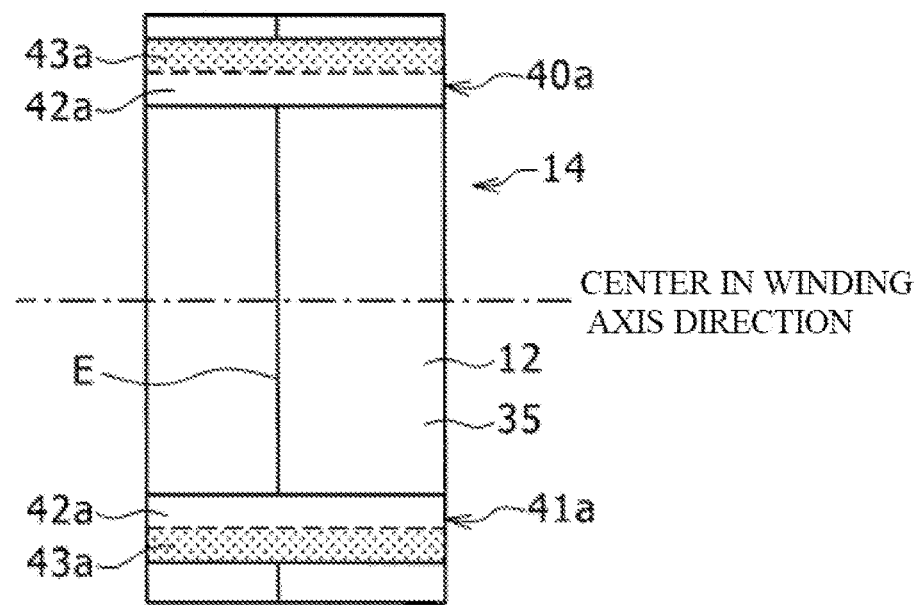
FIG. 7 is a diagram illustrating the electrode group, as viewed from a winding outer side, in the non-aqueous electrolyte secondary battery of another example of the embodiment.

FIG. 6 is a perspective view of an electrode group 14 in a non-aqueous electrolyte secondary battery of another example of the embodiment. FIG. 7 is a diagram illustrating the electrode group 14, as viewed from a winding outer side, in the non-aqueous electrolyte secondary battery of another example of the embodiment. In a configuration of this example, in the winding axis direction α, a first region 42a formed by a base material layer is disposed in one end portion on a center side of the electrode group 14 of both end portions of each of a first tape 40a and a second tape 41a, and a second region 43a formed by the base material layer and an adhesive layer is disposed in the other end portion on an end side of the electrode group 14. In FIGS. 6 and 7, in the tapes 40a and 41a, the first region 42a is represented by a plain portion, and the second region 43a is represented by a sand-like pattern portion. As in the configuration illustrated in FIGS. 1 to 5, also in this example, the manufacturing workability can be ensured and the electrode plate deformation can be suppressed. The rest configuration and action of this example is similar in configuration and action to the example illustrated in FIGS. 1 to 5.

EXPERIMENTAL EXAMPLES

The inventors of the present disclosure fabricated four types of secondary batteries for Examples 1 and 2, and Comparative Examples 1 and 2 under the conditions shown in Table 1 shown below, performed charging and discharging under predetermined conditions, and confirmed the degree of electrode plate deformation.

TABLE 1

|  | Arrangement and position of adhesive layer of tape | Degree of electrode plate deformation |
| --- | --- | --- |
| Example 1 | Center portion in winding axis direction | A |
| Example 2 | End side in winding axis direction | A |
| Comparative Example 1 | Entire surface in winding axis direction | B |
| Comparative Example 2 | Inner side in winding axis direction | B |

Examples

Example 1

[Fabrication of Positive Electrode Plate]

As a positive electrode active material, a lithium nickel cobalt aluminum complex oxide represented by $LiNi_{0.88}Co_{0.09}Al_{0.03}O_2$ was used. A positive electrode mixture slurry was prepared by: mixing 100 parts by mass of $LiNi_{0.88}Co_{0.09}Al_{0.03}O_2$ (positive electrode active material), 1.0 part by mass of acetylene black, and 0.9 parts by mass of polyvinylidene fluoride (PVDF) (binding agent) in a solvent such as N-methyl-2-pyrrolidone (NMP). The paste-form positive electrode mixture slurry was then uniformly applied to both sides of an elongated positive electrode current collector formed from a 15 μm-thick aluminum foil, dried at a temperature of 100 to 150° C. in a heated drying apparatus to remove NMP, and then rolled with a roll press, thereby obtaining the elongated positive electrode plate. Furthermore, the positive electrode plate after rolling was heat-treated by being brought into contact with a roll heated to 200° C. for 5 seconds, and was cut into a predetermined electrode size (0.144 mm in thickness, 62.6 mm in width, 861 mm in length), thereby fabricating the positive electrode plate 11. Note that a crystal structure of $LiNi_{0.88}Co_{0.09}Al_{0.03}O_2$ was a layered rock salt structure (hexagonal crystal, space group R3-m). In addition, a plain portion in which no active material was formed in the center portion of the positive electrode plate 11 in a length direction was formed and a positive electrode lead made of aluminum was fixed to the plain portion.

[Fabrication of Negative Electrode Plate]

As a negative electrode active material, a mixture of 95 parts by mass of graphite powders and 5 parts by mass of a silicon oxide was used. A negative electrode mixture slurry was prepared by: mixing 100 parts by mass of the negative electrode active material, 1 part by mass of a styrene-butadiene rubber (SBR) as a binder, and 1 part by mass of a carboxymethyl cellulose (CMC) as a thickening agent; and dispersing the resulting mixture in water. The negative electrode mixture slurry was then applied to both sides of the negative electrode current collector formed from an 8 μm-thick copper foil, and was dried in a heated drying apparatus, and was then compressed by a compression roller to have a thickness of 0.160 mm, thereby adjusting the thickness of a negative electrode active material layer. Subsequently, the elongated negative electrode plate was cut into a predetermined electrode size (64.2 mm in width, 959 mm in length), thereby fabricating a negative electrode plate 12. In addition, a negative electrode lead made of nickel/copper/nickel was attached to a plain portion of the negative electrode plate 12.

[Fabrication of Electrode Group]

A wound-type electrode group 14 was fabricated by spirally winding the fabricated positive electrode plate 11 and negative electrode plate 12 with a separator 13 made of polyethylene interposed therebetween.

[Fixation of Electrode Group]

The adhesive layer 45 having a thickness of 10 μm was coated in a both-side dry edge pattern (a configuration in which the first region, the second region and the first region were disposed in this order from the end side of the electrode group in the winding axis direction to have widths of 2 mm, 5 mm, and 2 mm, respectively) on a base material layer made of polypropylene having a thickness 20 μm as in the configuration illustrated in FIGS. 1 to 5, and tapes 40 and 41 each having a width of 9 mm and a length of 60.0 mm were cut out. Then, the tapes 40 and 41 were attached to both end portions in the winding axis direction on the electrode group 14 including a winding-finish end of the negative electrode plate 12 to fix the electrode group 14. At this time, the negative electrode current collector 35 was exposed on an outermost periphery of the electrode group 14.

[Preparation of Non-Aqueous Electrolyte Solution]

A non-aqueous electrolyte solution as non-aqueous electrolyte was prepared by: adding 5 parts by mass of vinylene carbonate (VC) to a mixed solvent prepared by mixing ethylene carbonate (EC) and dimethyl carbonate (DMC) in a volume ratio EC:DMC=1:3; and further dissolving $LiPF_6$ at 1.5 mol/L.

[Fabrication of Secondary Battery]

A cylindrical non-aqueous electrolyte secondary battery was fabricated by: arranging insulating plates 17 and 18 on the upper side and the lower side of the above-described electrode group 14; welding the negative electrode lead to a bottom portion of the case body 15; welding the positive electrode lead to the sealing assembly 16; housing the electrode group 14 in the case body 15 having a bottomed cylindrical shape; then feeding the non-aqueous electrolyte solution inside the case body 15 in a reduced pressure mode; and sealing an opening end portion of the case body 15 by the gasket 27 and the sealing assembly 16. At this time, the battery had a battery capacity of 4600 mAh.

Example 2

Example 2 is similar in configuration to that illustrated in FIGS. 6 and 7. In each of the first tape 40a and the second tape 41a, the adhesive layer 45 was coated in a one-side dry edge pattern (a configuration in which the second region and the first region were disposed in this order from the end side of the electrode group in the winding axis direction to have widths of 4.5 mm and 4.5 mm, respectively) on the base material layer. The rest configuration of Example 2 is the same as that of Example 1.

Comparative Example 1

Figure 8:
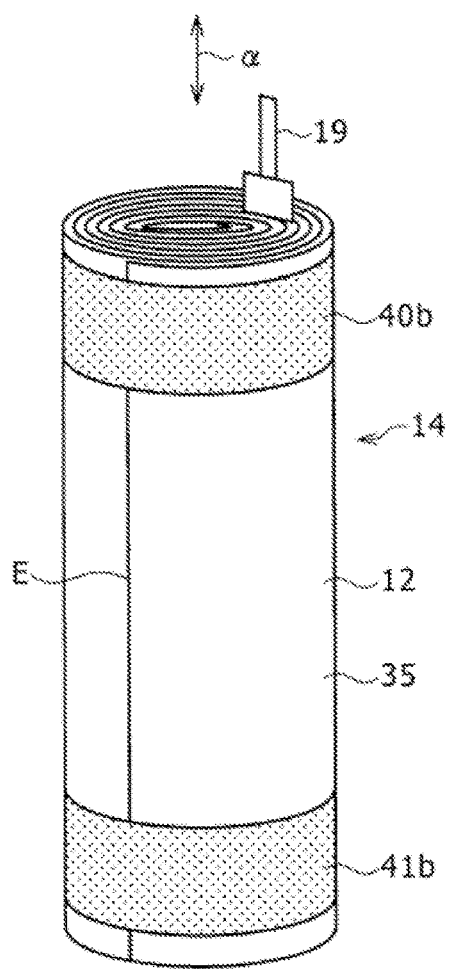
FIG. 8 is a perspective view of an electrode group in a non-aqueous electrolyte secondary battery of Comparative Example 1.

FIG. 8 is a perspective view of an electrode group 14 in a non-aqueous electrolyte secondary battery of Comparative Example 1. In Comparative Example 1, as illustrated in FIG. 8, the first tape 40b and the second tape 41b were used, each having a configuration in which an adhesive layer was disposed on the entire surface on the winding inner side of the base material layer. The rest configuration of Comparative Example 1 is the same as that of Example 1.

Comparative Example 2

Figure 9:
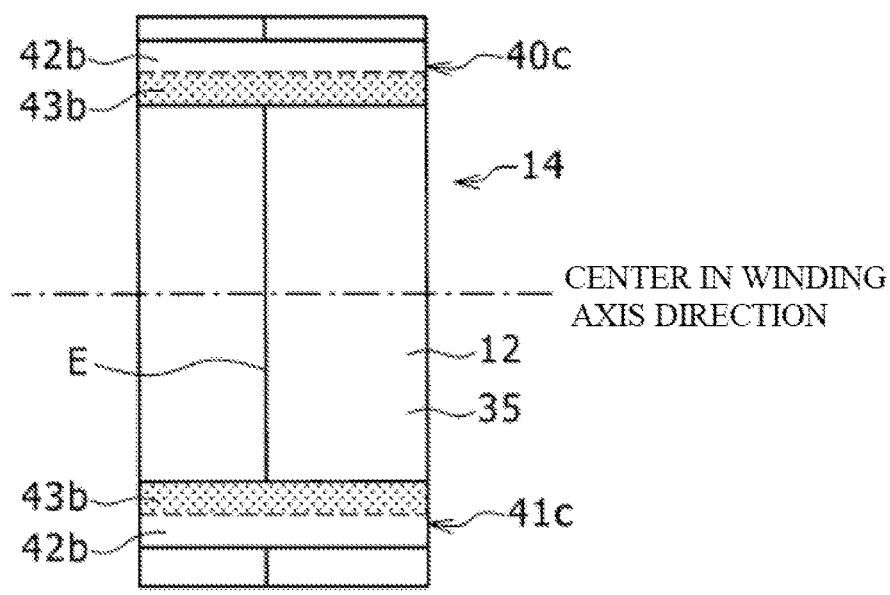
FIG. 9 is a diagram illustrating an electrode group, as viewed from a winding outer side, in a non-aqueous electrolyte secondary battery of Comparative Example 2.

FIG. 9 is a diagram illustrating an electrode group, as viewed from a winding outer side, in a non-aqueous electrolyte secondary battery of Comparative Example 2. In Comparative Example 2, as illustrated in FIG. 9, in each of a first tape 40c and a second tape 41c, a first region 42b formed by only a base material layer is disposed in a portion more distant from a center of the electrode group 14 in a winding axis direction α, and a second region 43b including the base material layer and an adhesive layer is disposed in a portion closer to the center of the electrode group 14. In FIG. 9, in the tapes 40c and 41c, the first region 42b is represented by a plain portion, and the second region 43b is represented by a sand-like pattern portion. In each of the first tape 40c and the second tape 41c, the adhesive layer 45 was coated in a one-side dry edge pattern (a configuration in which the first region and the second region were disposed in this order from the end side of the electrode group in the winding axis direction to have widths of 4.5 mm and 4.5 mm, respectively) on the base material layer. The rest configuration of Comparative Example 2 is the same as that of Example 1.

[Test Method]

[Electrode Plate Deformation Check Method]

Each non-aqueous electrolyte secondary battery of Examples 1 and 2, and Comparative Examples 1 and 2 underwent constant-current (CC) charging at a current of 1380 mA (0.3 hour rate) under an environment of 25° C. until a battery voltage reached 4.2 V, followed by constant-voltage (CV) charging at the battery voltage of 4.2 V until a current value (end current) reached 92 mA. After resting for 20 minutes, the secondary battery underwent constant current discharging at a discharge current at 4600 mA (1 hour rate), and rested for 20 minutes. This was set as one charge-and-discharge cycle. Such a charge-and-discharge cycle was repeated 500 cycles. After 500 cycles, the battery underwent the constant-current charging at the current of 1380 mA (0.3 hour rate) until the battery voltage reached 4.2 V, followed by constant-voltage charging at the battery voltage of 4.2 V until the end current reached 92 mA. Subsequently, as for the above-described battery, cross sectional observation of the center portion of the electrode group was performed using an X-ray CT device. The cross-sectional observation was performed at a position in the winding axis direction at which an inner end of the tape in the width direction (a center side end of the electrode group in the winding axis direction) was positioned on the outermost peripheral surface of the electrode group. At this position, the stress tends to become high when the electrode group expands. The degree of deformation of the center portion of the electrode group is classified into A and B in the column of "degree of electrode plate deformation" in Table 1 described above.

Figure 10:
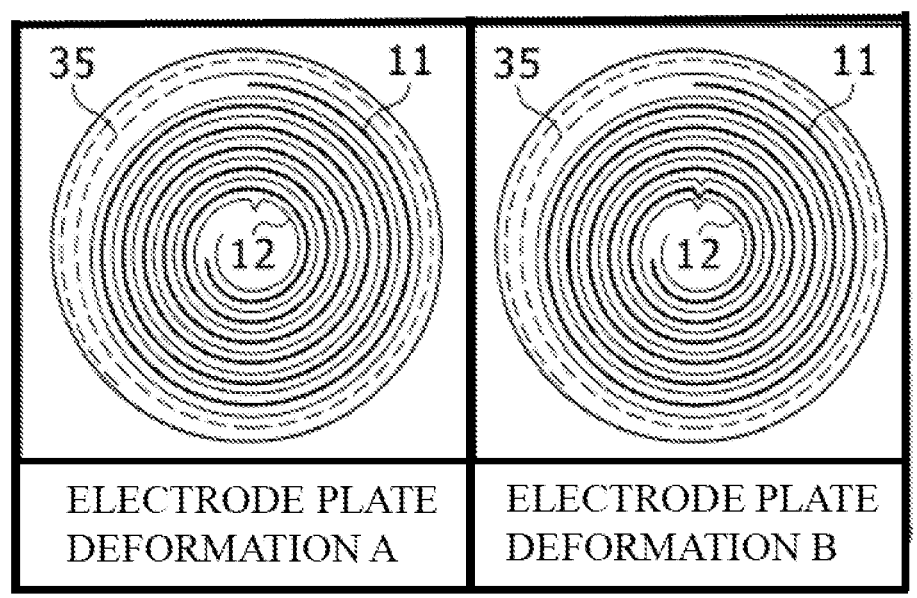
FIG. 10 is a sectional view of the electrode group perpendicular to the winding axis direction, and shows two degrees A and B of electrode plate deformation used to estimate experiment results for checking the electrode plate deformation in the electrode group.

FIG. 10 is a sectional view of the electrode group perpendicular to the winding axis direction, and shows two degrees A and B of electrode plate deformation used to estimate experiment results for checking the electrode plate deformation in the electrode group. The degree A of deformation is lower than the other degree, and shows that the deformation occurs in only the innermost peripheral portion of the electrode group. Note that in FIG. 10, an outermost circle represents the battery case, and a curve indicated by a thick solid line inside the outermost circle represents the positive electrode plate 11. A curve indicated by a thin solid line represents a portion including an active material layer of the negative electrode plate 12, and a curve indicated by a thin dotted line represents a plain region in which only the negative electrode current collector 35 of the negative electrode plate 12 is provided.

The degree B of deformation is higher than the other degree, and shows that the deformation occurs in at least two peripheral portions including the innermost periphery of the electrode group.

[Test Results]

Table 1 shows that in Examples 1 and 2, the electrode plate deformation of the electrode group 14 occurred in only a first winding portion which is the innermost winding portion, and the degree of electrode plate deformation was classified to A. From the results of Examples 1 and 2, it was found that when the first region including the base material layer 44 was disposed in the portion closer to the center of the electrode group, the pressure of a winding inner surface of the base material layer 44 was decreased when the electrode group expanded, which enabled suppression of the electrode plate deformation during charging and discharging.

On the other hand, as shown in Table 1, in Comparative Examples 1 and 2, the level of the electrode plate deformation was classified to B, which means that the degree of the electrode plate deformation was increased. This is conceivably because the electrode plate deformation increased since the adhesive layer was insufficient in alleviation of stress concentration during charging and discharging.

Note that the above-described effects of the embodiments and working examples are considered not to depend on any of the positive electrode plate material, the negative electrode plate material, and the separator material, and can be expected for a configuration having a wound-type electrode group in which a tape is attached to a winding-finish end.

REFERENCE SIGNS LIST

10 non-aqueous electrolyte secondary battery
11 positive electrode plate
12 negative electrode plate
12a one-side active material region
12b both-side active material region
12c plain region
13 separator
14 electrode group
15 case body
16 sealing assembly
17, 18 insulating plate
19 positive electrode lead
21 projecting portion
22 filter
23 lower vent member
24 insulating member
25 upper vent member
26 cap
27 gasket
28 space
29 winding axis
35 negative electrode current collector
40, 40a, 40b, 40c first tape
41, 41a, 41b, 41c second tape
42, 42a, 42b first region
43, 43a, 43b second region
44 base material layer
45 adhesive layer
47 space
50 tape
51 first region
52 second region

The invention claimed is:

1. A non-aqueous electrolyte secondary battery, comprising:
   a bottomed cylindrical case body having an opening;
   a wound-type electrode group that is housed in the case body, and in which a positive electrode plate and a negative electrode plate are wound with a separator interposed therebetween; and
   at least one tape that is attached to an outermost peripheral surface of the electrode group to fix a winding-finish end of the electrode group to the outermost peripheral surface of the electrode group,
   wherein the tape is attached to at least one of both end portions of the electrode group in a winding axis direction,
   a current collector of the negative electrode plate is exposed on at least a part of the outermost peripheral surface of the electrode group in a winding direction, and the current collector contacts the case body,
   the tape includes a base material layer, and an adhesive layer that is disposed continuously in the winding direction on a winding inner surface of the base material layer, wherein the adhesive layer faces the outermost peripheral surface of the electrode group, and
   when a region of the tape as viewed from the winding inner surface is divided into a first region formed by the base material layer and a second region formed by the base material layer and the adhesive layer, in the winding axis direction of the electrode group, the first region is disposed at least in an end portion on a center side of the electrode group of both end portions of the tape, to be adjacent to the second region.

2. The non-aqueous electrolyte secondary battery according to claim 1, wherein
   the tape is attached to each of both end portions of the electrode group in the winding axis direction.

3. The non-aqueous electrolyte secondary battery according to claim 1, wherein
   the first region is disposed on each of both end portions of the tape in the winding axis direction.

* * * * *